United States Patent [19]

Rainey et al.

[11] Patent Number: 4,838,411

[45] Date of Patent: Jun. 13, 1989

[54] LIFT AND CARRY ACCUMULATING CONVEYOR

[75] Inventors: Frank W. Rainey; Harvey R. Clement, both of Holly, Mich.

[73] Assignee: Excel Corporation, Fenton, Mich.

[21] Appl. No.: 142,444

[22] Filed: Jan. 11, 1988

[51] Int. Cl.$^4$ ............................................. B65G 25/00
[52] U.S. Cl. ......................................... 198/774; 74/60
[58] Field of Search ............................... 198/774, 778; 414/525 B; 74/60

[56] References Cited

U.S. PATENT DOCUMENTS

| | | | |
|---|---|---|---|
| 4,042,104 | 8/1977 | Furlette et al. | 198/774 |
| 4,254,860 | 3/1981 | Koontz | 198/774 X |
| 4,364,471 | 12/1982 | Furlette et al. | 198/774 X |
| 4,397,174 | 8/1983 | Jungesjo | 198/774 X |
| 4,479,576 | 10/1984 | Di Rosa | 198/774 |
| 4,496,042 | 1/1985 | Rise | 198/774 |

FOREIGN PATENT DOCUMENTS 1051003 10/1983 U.S.S.R. .............................. 198/774

*Primary Examiner*—Robert J. Spar
*Assistant Examiner*—James R. Bidwell
*Attorney, Agent, or Firm*—Gifford, Groh, Sheridan, Sprinkle and Dolgorukov

[57] ABSTRACT

A lift and carry accumulating conveyor having a frame with a pair of elongated, spaced apart and parallel stationary rails. A pair of elongated, spaced apart and parallel movable rails are mounted to the frame so that the movable rails are movable between a forward and a retracted position as well as between an upper and a lower position and so that the movable rails extend generally parallel to the stationary rails. A shaft is rotatably mounted to the frame and is rotatably driven by a motor. A disk is obliquely attached to the shaft and is mechanically coupled to one end of the lever while the other end of the lever is attached to the movable rails to move the movable rails between the forward and retracted position upon rotation of the shaft. An eccentric cam is also attached to the shaft and, through a plunger attached at one end to the movable rails, vertically moves the movable rails between the upper and lower position upon rotation of the shaft. The stationary and movable rails can include both straight sections and arcuate sections.

8 Claims, 7 Drawing Sheets

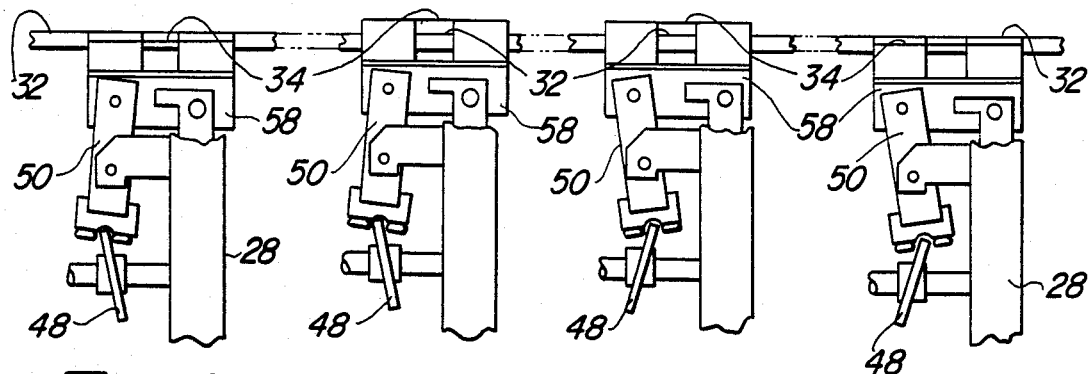
*Fig-7A*  *Fig-7B*  *Fig-7C*  *Fig-7D*
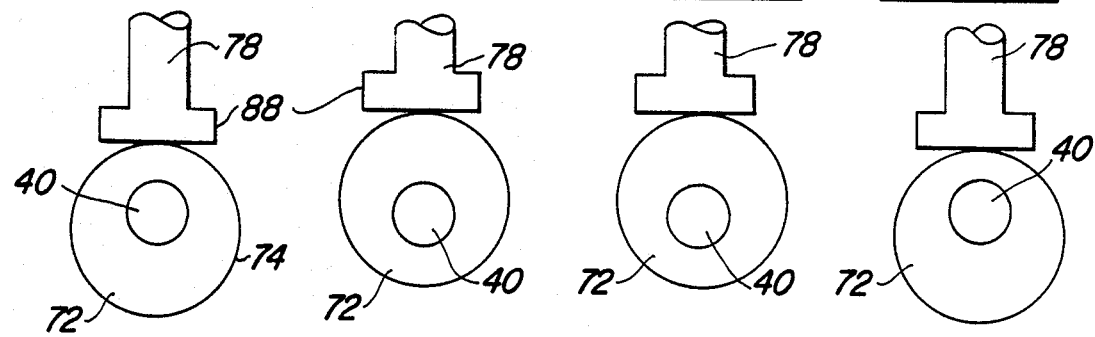
*Fig-8A*  *Fig-8B*  *Fig-8C*  *Fig-8D*
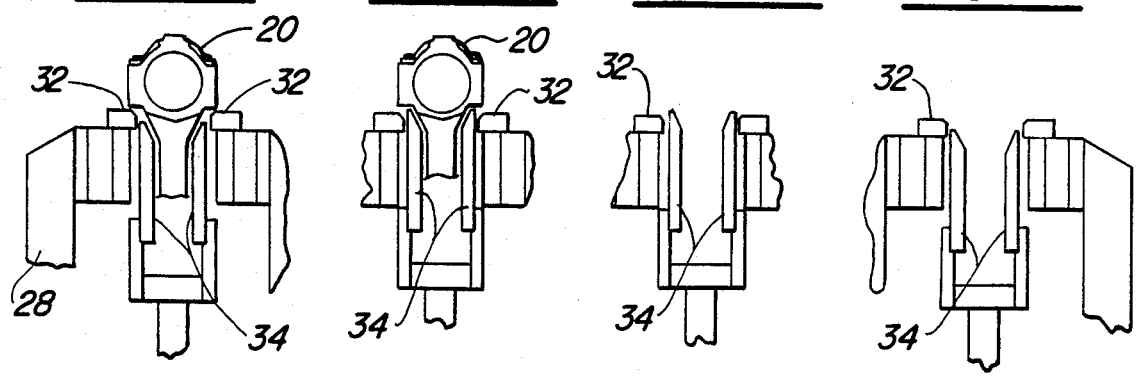
*Fig-9A*  *Fig-9B*  *Fig-9C*  *Fig-9D*
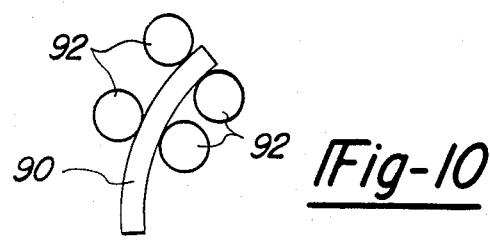
*Fig-10*
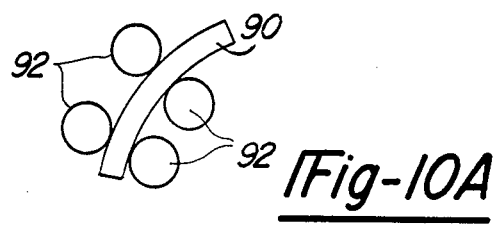
*Fig-10A*

2

LIFT AND CARRY ACCUMULATING CONVEYOR

BACKGROUND OF THE INVENTION

I. Field of the Invention

The present invention relates generally to conveyors and, more particularly, to a lift and carry accumulating conveyor.

II. Description of the Prior Art

There are a number of previously known lift and carry conveyors for transporting various types of parts along a conveyor line. These previously known lift and carry conveyors typically comprise a pair of spaced apart and parallel stationary rails as well as at least one movable rail which extends generally parallel to the stationary rails.

The movable rail is movable both between a forward and a retracted position as well as between an upper and a lower position. Thus, in order to convey parts supported by the stationary rails along the conveyor line, the movable rail, when in its retracted and lower position, is first moved to an upper position thus lifting the parts up from the stationary rails. The movable rail is then moved to the forward position and, thereafter, to the lower position. When the movable rail is moved to its lower position, the parts are again placed upon the stationary rails so that the parts are effectively transported along the conveyor line by a distance equal to the stroke of the movable rail between its forward and retracted position. The movable rail is then moved to its lower retracted position and the above cycle is repeated.

One disadvantage of the previously known lift and carry conveyors, however, is that such conveyors are only capable of transporting parts along a straight conveyor line. Consequently, when it is necessary to change the direction of the conveyor line, a complex transfer mechanism is also employed to move the parts from one straight conveyor and to a second straight conveyor line.

A still further disadvantage of these previously known lift and carry conveyors is that one drive mechanism is employed to move the movable rail between its forward and retracted position while a second drive motor is used to move the movable rail between its upper and its lower position. The two drive motors must necessarily be synchronized with respect to each other in order to provide required sequential movement of the movable rail relative to the stationary rails. The use of two drive motors, together with the required synchronizing means, disadvantageously increases the complexity and cost of the overall lift and carry conveyor.

SUMMARY OF THE INVENTION

The present invention provides a lift and carry accumulating conveyor which overcomes all of the above mentioned disadvantages of the previously known devices.

In brief, the lift and carry conveyor system of the present invention comprises a frame having a pair of elongated, spaced apart and parallel stationary rails. These stationary rails are dimensioned to support the parts which are to be transported along the conveyor line.

A pair of elongated, spaced apart and parallel movable rails are mounted to the frame so that the movable rails are movable between a forward and a retracted position and between an upper and a lower position. These movable rails extend generally parallel to the stationary rails and, when in their upper position, lift the parts on the conveyor line up above the stationary rails.

A shaft is rotatably mounted to the frame and a motor rotatably drives the shaft. A disk is secured to the shaft so that the axis of the disk is oblique with respect to the axis of the shaft. A lever is then pivotally secured to the frame so that one end of the lever is pivotally secured to the movable rails while a U-shaped yoke is attached to the opposite end of the lever. This yoke is positioned around the outer periphery of the disk so that, upon rotation of the shaft and thus rotation of the disk, the disk pivots the lever around the central pivot point. In doing so, the disk reciprocally drives the movable rails between their forward and retracted position for each revolution of the shaft.

In order to vertically displace the movable rails between their upper and lower position, an eccentric cam is also secured to the shaft so that the cam rotates in unison with the shaft. An elongated rod has its upper end secured to the movable rails while a cam follower is mounted to the lower end of the rod. This cam follower engages a cam surface on the cam so that, upon rotation of the shaft, the cam vertically drives the movable rails between their upper and lower position. Furthermore, the conveyor system includes a plurality of the cams which are secured to the shaft at spaced intervals therealong.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIGS. 7A-7D, 8A-8D, 9A-9D, 10-10A are diagrammatic views illustrating the operation of the preferred embodiment of the present invention; and FIGS. 11 and 11A are fragmentary top view of the preferred embodiment of the invention.

DETAILED DESCRIPTION OF A PREFERRED EMBODIMENT OF THE PRESENT INVENTION

Figure 1:
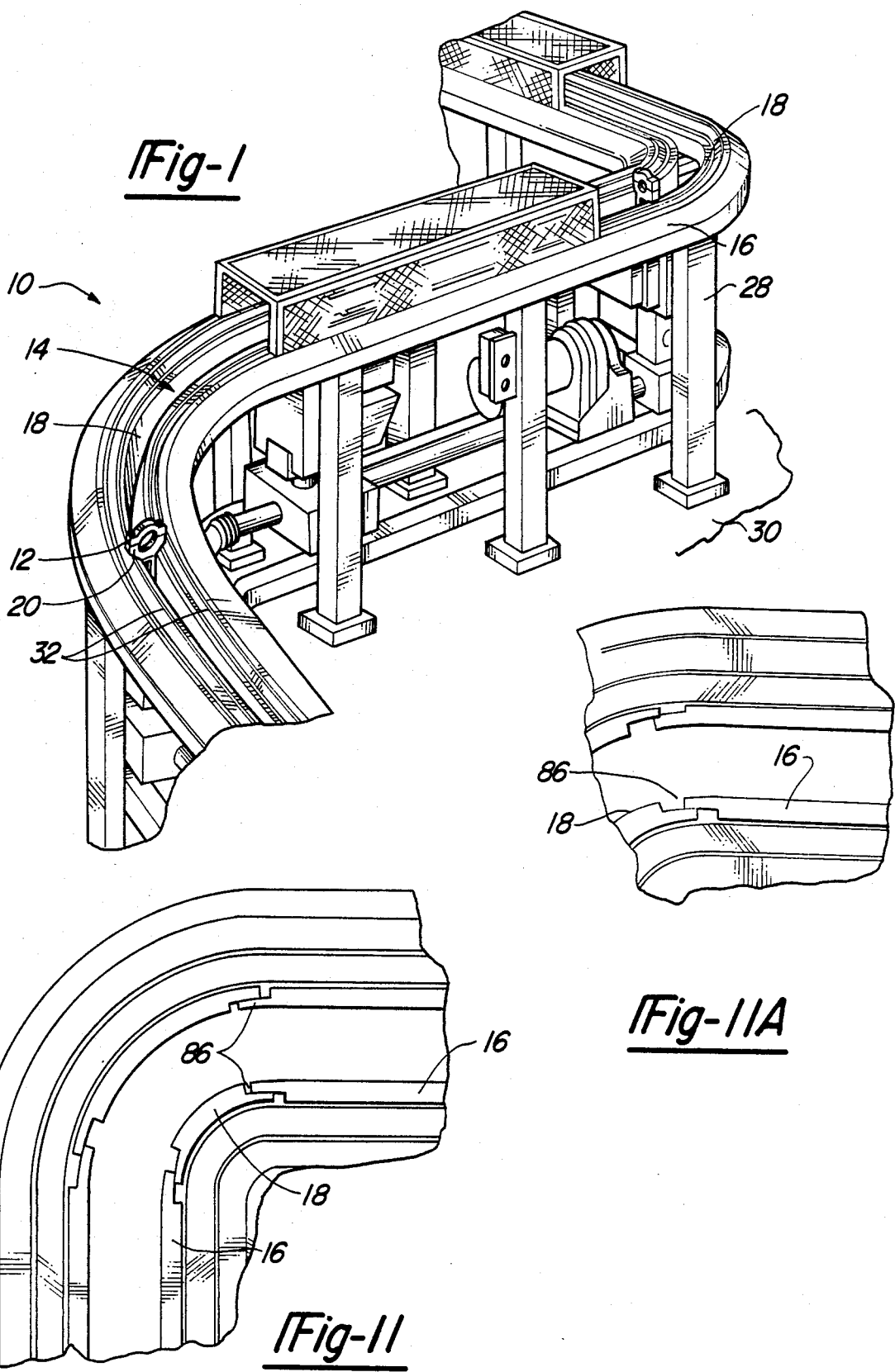
FIG. 1 is a perspective view illustrating a preferred embodiment of the present invention.

With reference first to FIG. 1, a preferred embodiment of the conveyor system 10 of the present invention is thereshown for transporting parts 12 along a conveyor line 14. The conveyor line 14 can include both straight sections 16 as well as curved sections 18.

Figure 3:
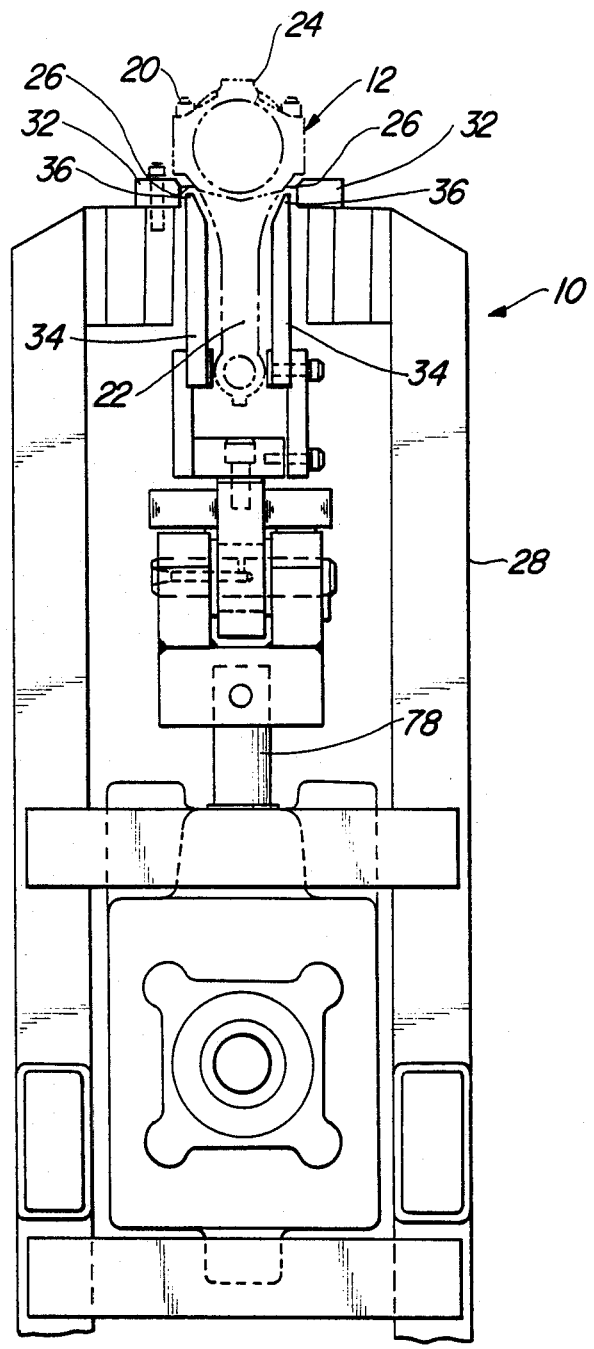
FIG. 3 is a view taken substantially along line 3—3 in FIG. 2.

With reference now to FIG. 3, the parts 12 which are conveyed along the conveyor system are there illustrated as a connecting rod 20 for an internal combustion engine. The connecting rod 20 thus includes an elongated rod section 22 as well as a circular crankshaft connecting portion 24. The crankshaft connection portion 24, furthermore, includes a pair of lateral surfaces 26 which extend outwardly from the rod 22. It will be understood, however, that although the conveyor system 10 of the present invention will be described as a conveyor for transporting the connecting rods 20 along the conveyor line 14, the conveyor system 10 can alternatively be adapted for other types of parts.

Figure 2:
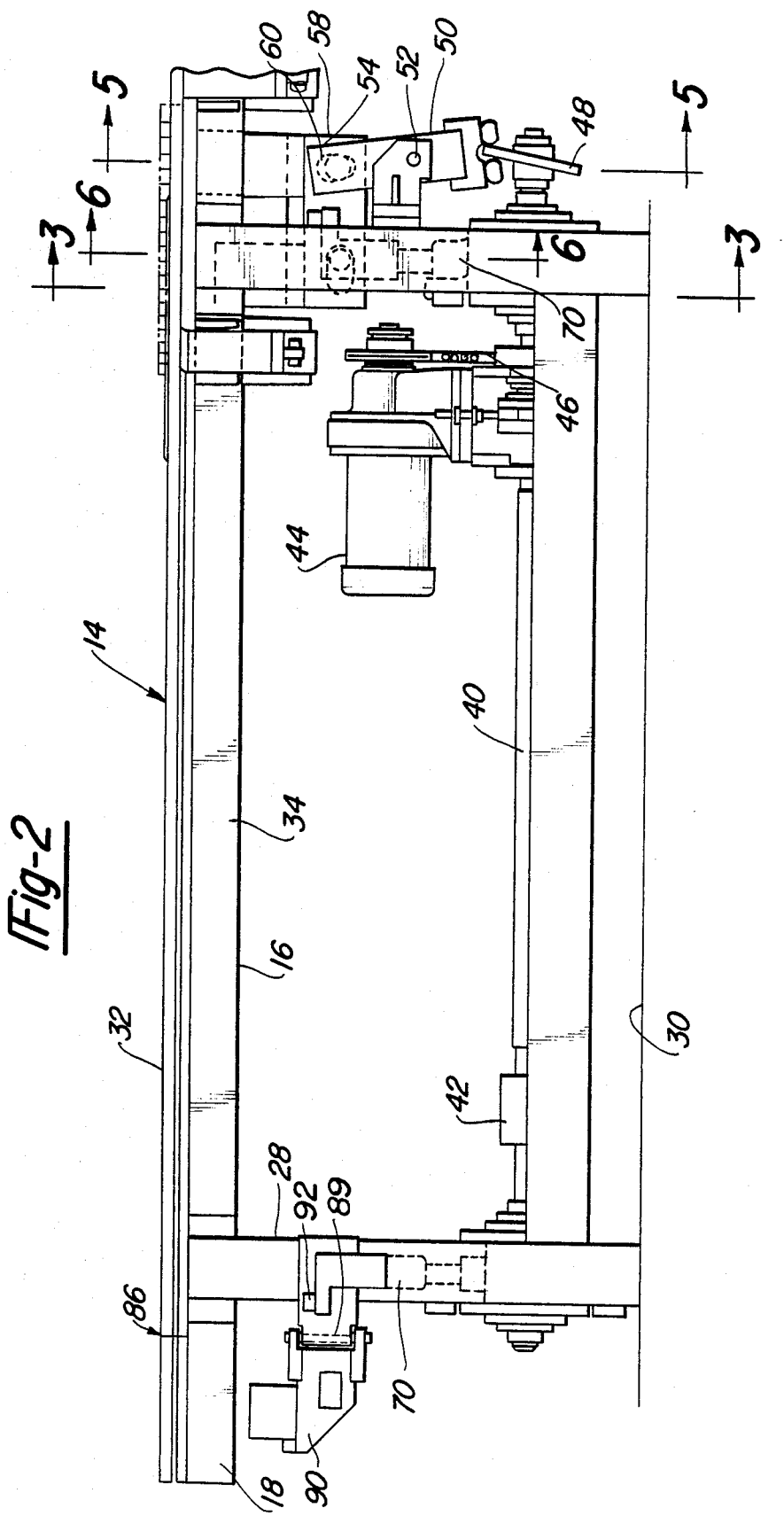
FIG. 2 is a side fragmentary view illustrating a portion of the preferred embodiment of the present invention.

With reference now to FIGS. 1-3, the conveyor system 10 includes a frame 28 which is supported on a ground surface 30. A pair of elongated, spaced apart and parallel rails 32 are secured to the frame 28 so that the rails 32 extend along the entire length of the conveyor line 14. These rails 32, as best shown in FIG. 3, are spaced apart from each other by a distance so that the rails 32 engage and support the surfaces 26 on the connecting rods 20.

With reference now particularly to FIGS. 2 and 3, a pair of elongated, spaced apart and parallel movable rails 34 are movably mounted between both an upper and a lower position, as well as between a forward and a retracted position, to the frame 28 in a fashion which will subsequently be described in greater detail. These movable rails 34, furthermore, extend parallel to the stationary rails 32 and are preferably contained in between the stationary rails 32 as best shown in FIG. 3. The movable rails 34 each include an upper end 36 which is adapted to engage the horizontal surface 26 of the connecting rod 20 in a fashion which will also be later described in greater detail.

With reference now particularly to FIG. 2, an elongated shaft 40 is rotatably mounted to the conveyor frame 28 so that the shaft 40 extends underneath, but generally parallel to the conveyor line 14. The shaft 40 may be segmented and the segments coupled together by universal joints 42. In addition, a motor 44 is drivingly connected by any conventional means, such as a chain drive 46, to the shaft 40 so that the motor 44 rotatably drives the shaft 40.

Figure 4:
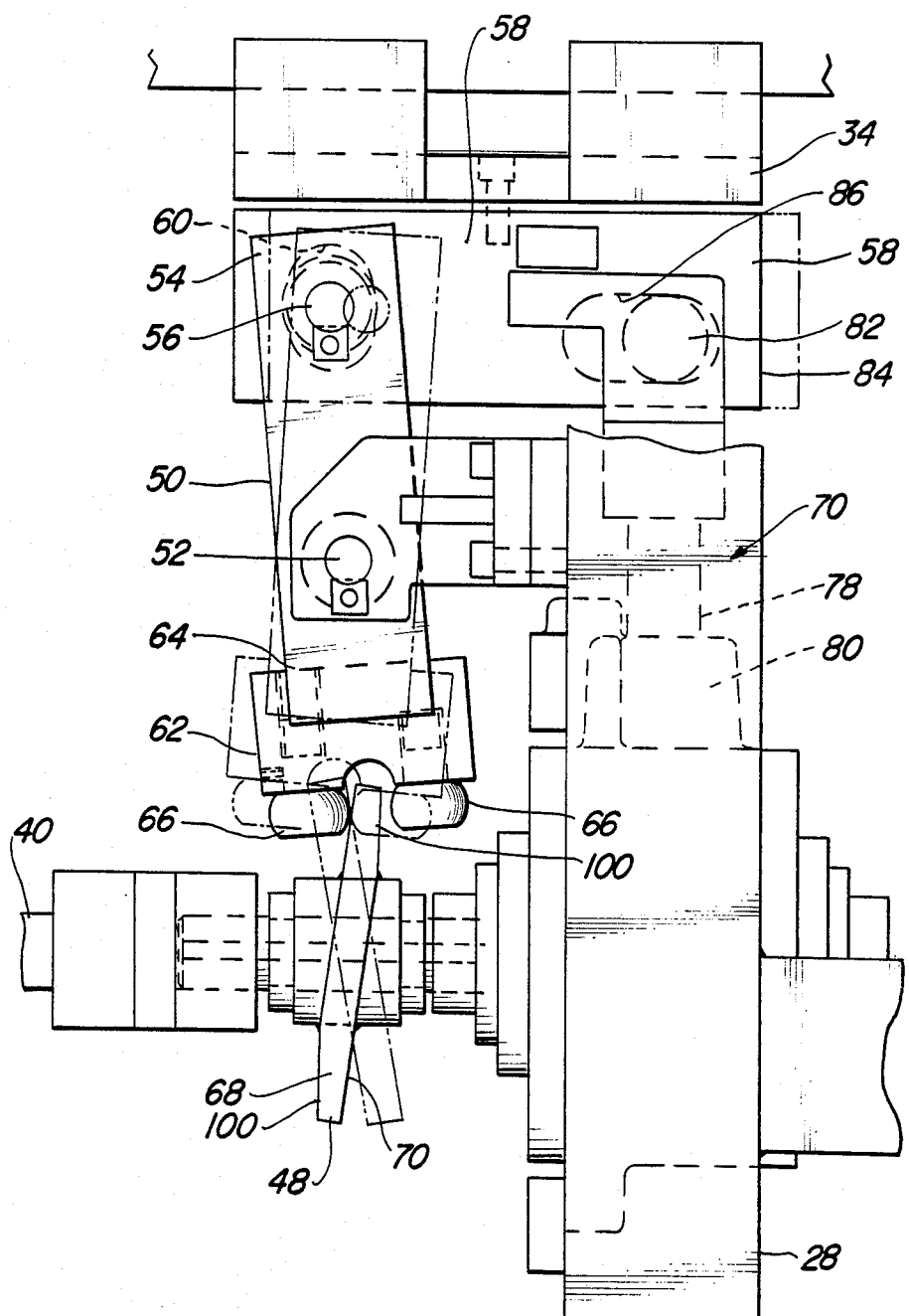
FIG. 4 is a side view illustrating a portion of the preferred embodiment of the invention and enlarged for clarity.
Figure 5:
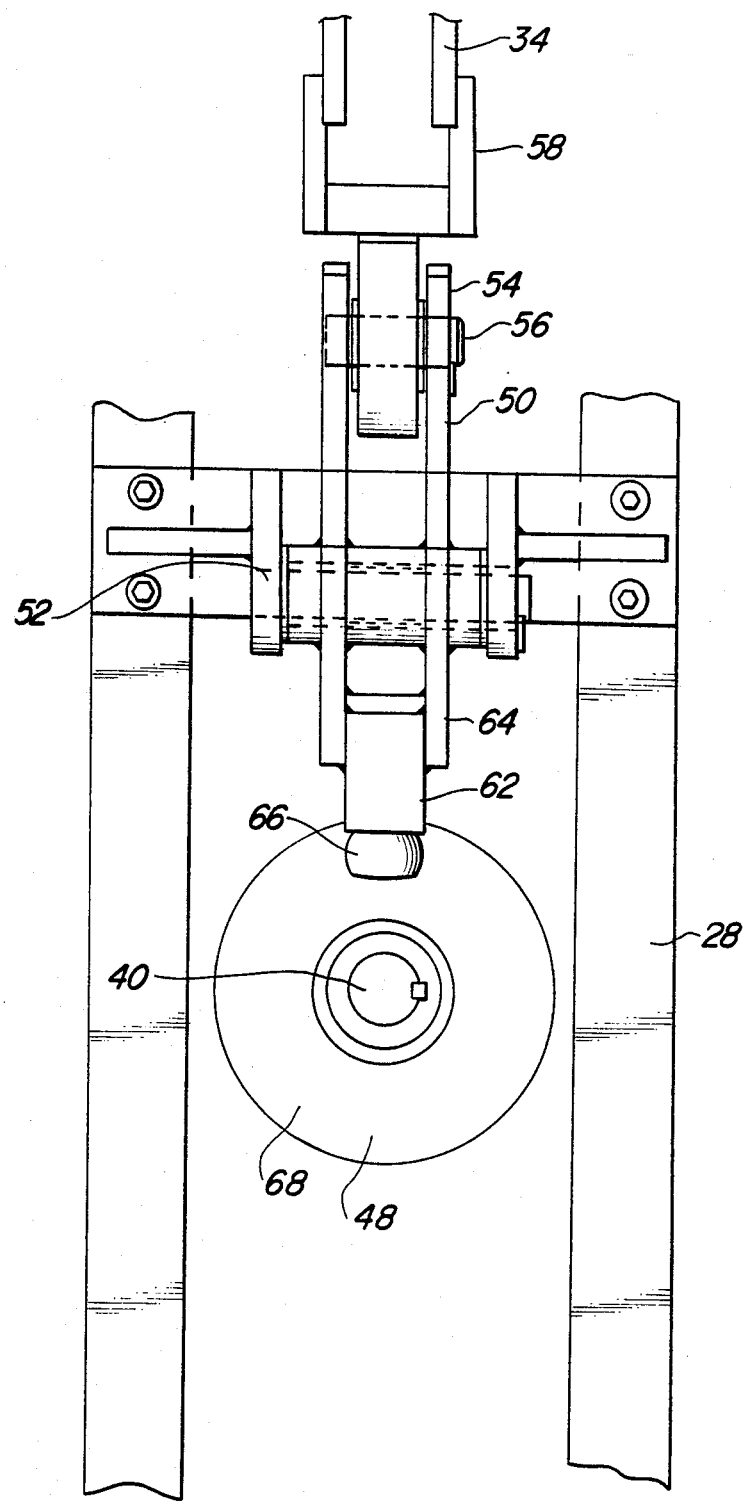
FIG. 5 is a view taken substantially along line 5—5 in FIG. 2.

With reference now to FIGS. 2, 4 and 5, a circular disk 48 is secured to the shaft 40 so that the axis of the disk 48 is oblique with respect to the axis of the shaft 40. Thus, upon rotation of the shaft 40, the disk "wobbles" between the position shown in solid line in FIG. 4 and the position shown in phantom line in FIG. 4.

An elongated and vertically extending lever 50 is pivotally secured by a pivot pin 52 to the frame 28 so that the lever 50 pivots about a generally horizontal axis extending transversely with respect to the conveyor line 14.

An upper end 54 of the lever 50 is pivotally connected by a connecting pin 56 to a channel member 58 and this channel member 58 is, in turn, connected to the movable rails 34 as best shown in FIG. 5. Furthermore, as best shown in FIG. 4, the connecting pin 56 extends through a vertically extending slot 60 in the channel member 58 to allow limited vertical movement of the channel member 58 with respect to the connecting pin 56.

Referring now to FIGS. 4 and 5, a generally U-shaped yoke 62 is attached to a lower end 64 of the lever 50. This yoke 62 includes two rollers 66 which respectively engage opposite sides 68 and 70 of the disk 48 adjacent its outer periphery.

With reference particularly to FIG. 4, rotation of the shaft 40 by the motor 44 (FIG. 2) creates a wobbling movement of the disk 48 between the position shown in solid line and the position shown in phantom line. This wobbling movement of the disk 48 in turn pivotally drives the lever 50 about the pivot pin 52 between the position shown in solid line and phantom line due to the mechanical coupling between the disk 48 and the lever yoke 62. Since the upper end 54 of the lever 50 is mechanically coupled to the channel member 58, and thus to the movable rails 34, rotation of the disk 48 reciprocally drives the movable rails 34 between a forward position and a retracted position with respect to the frame 28. Furthermore, one complete longitudinal stroke of the movable rails 34, i.e. from a retracted position, to a forward position and back to the retracted position, of the movable rails 34 is accomplished for each revolution of the shaft 40.

With reference now particularly to FIG. 2, a lifter assembly 70 is provided between the frame 28 and the movable rails 34 for moving the rails 34 between an upper position and a lower position in a fashion which will be subsequently described in greater detail. Furthermore, one lifter assembly 70 is provided at spaced intervals along the frame 28. Only one lifter assembly 70 will be described in detail, it being understood that a like description shall also apply to the other lifter assemblies.

Figure 6:
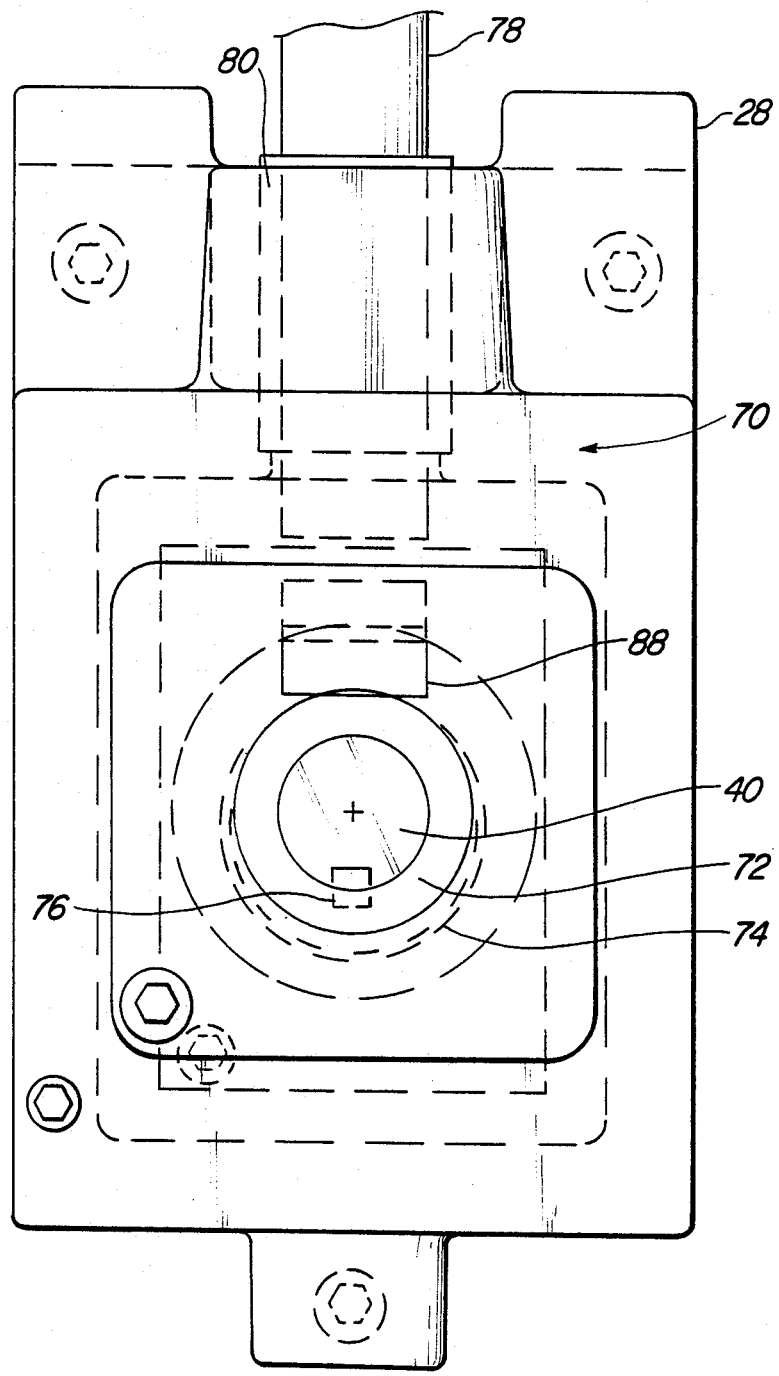
FIG. 6 is a view taken substantially along line 6—6 in FIG. 2.

With reference now to FIGS. 4 and 6, a lifter assembly 70 is thereshown in greater detail and comprises an eccentric cam 72 having an outer cam surface 74 which is mounted to the shaft 40. The cam 72 is secured against rotation to the shaft 40 by any conventional means, such as a key 76 (FIG. 6) so that the cam 72 rotates in unison with the shaft 40.

A rod 78 is vertically slidably mounted in a bushing 80 secured to the frame 28. A cross pin 82 (FIG. 4) is attached to an upper end 84 of the rod 78. This cross pin 82 is positioned within a longitudinally extending slot 86 in the channel member 58 so that the channel member 58 moves vertically in unison with the rod 78 but so that the channel member 58 can longitudinally slide with respect to the cross pin 82 and thus with respect to the rod 78.

As best shown in FIG. 6, a cam follower 88 is provided at the lower end of the rod 78. The cam follower engages the cam surface 74 of the cam 72. Consequently, upon rotation of the shaft 40, the cam 72 vertically moves the rod 78 and thus vertically moves the channel member 58 with its attached movable rails 34 between an upper and a lower position. The movable rails 34 move in unison with each other along the entire conveyor line 14. Furthermore, as best shown in FIGS. 2, 11 and 11A in order to connect a straight conveyor section 16 to a curved conveyor section 18, the movable rails 34 are split at the intersection as shown at 86. In addition, the adjacent rail sections 16 and 18 are then connected together by a vertically extending pivot pin 89 (FIG. 2) which allows the curved section 18 to pivot slightly with only nominal movement with respect to the straight section 16 at the split 86.

In order to guide the movement of the curved conveyor section 18 during longitudinal movement, a curved plate 90 is indirectly connected to the movable rails 34 on the curved section 18 which has the same radius of curvature as the curved section 18.

The curved plate 90 is fixed to the curved section 18 so these elements operate as one. Accordingly, the section 18 pushes against the movable rails 34. Rollers 92 mounted to the frame 28 engage opposite sides of the curved plate 90 to prevent the curved plate 90, and thus the curved movable rail 34, from moving transversely with respect to the frame 28. The rollers 92, however, allow the curved section of the movable rails 34 to move longitudinally or arcuately about their radius of curvature.

The operation of the conveyor system of the present invention will now be described with reference now to FIGS. 7-9. It will be understood, however, that the views shown in FIGS. 7-9 are diagrammatic in nature and are not intended to show the exact position of the parts relative to each other, but rather to illustrate the operation of the conveyor system.

Assuming then that FIGS. 7A-9A all show the conveyor with the movable rails 34 in both their lower and their retracted position. As best shown in FIG. 9A, in the lower position, the movable rails are positioned below the stationary rails 32 so that the parts 20 are supported by the stationary rails 32. At this time, the cam follower 88 abuts against the cam 72 on the cam surface 74 in which the distance between the center of the shaft 40 and the cam surface 74 is the smallest.

Upon continued rotation of the shaft 40 to the position shown in FIGS. 7B-9B, the cam 72 is rotated so that the cam follower 88, and thus the movable rails 34 are moved to their upper position. In doing so, the movable rails 34 lift the parts 20 up from the stationary rails 32.

Continued rotation of the shaft 40 to the position shown in FIGS. 7C-9C, moves the movable rails 34 longitudinally while maintaining the movable rails 34 in their upper position. In doing so, the movable rails 34 transport the parts 20 longitudinally along the stationary rails 32.

Continued rotation of the shaft 40 to the position shown in FIGS. 7D-9D, moves the movable rails 34 to their lower position while the movable rails 34 are in their forward position thus placing the parts 20 upon the stationary rails 32 but at a forward position upon the stationary rails 32. Consequently, the parts 20 initially supported upon the stationary rails 32 as shown in FIG. 9A are moved forwardly along the stationary rails 32 by a distance equal to the longitudinal stroke of the movable rails 34. Furthermore, in the event that the parts are restrained against forward motion for any reason, the parts 20 simply slide along the movable rails 34 during the forward stroke of the movable rails 34, i.e. from the position shown in FIG. 7B and to the position shown in FIG. 7C, so that the parts 20 can accumulate along the conveyor system.

It will be understood, of course, that the movement of the movable rails is somewhat elliptical in shape rather than rectangular. However, as best shown in FIG. 4, the disk 48 preferably includes two flats 100 which are diametrically opposed to each other. These flats 100 cause the movable rails to dwell momentarily at both their forwardmost and rearwardmost position in order to allow a smooth transition as the parts 20 are both placed upon and lifted upwardly from the stationary rails 32.

FIG. 10 also shows the coaction between the curved plate 90 and the rollers 92 at the start and end of a curved section 18 of the movable rails 34. The rollers 92 are attached to the frame 28 and prevent transverse movement of the curved plate 90, and thus of the movable rails 34, while guiding the arcuate movement of the curved section of the movable rails 34 between the forward and the retracted position.

From the foregoing, it can be seen that the present invention provides a simple and yet highly effective lift and carry accumulating conveyor system.

Having described my invention, however, many modifications thereto will become apparent to those skilled in the art to which it pertains without deviation from the spirit of the invention as defined by the scope of the appended claims.

I claim:

1. A conveyor comprising:
a frame having a pair of elongated, spaced apart and parallel stationary rails,
a pair of elongated, spaced apart and parallel movable rails,
means for mounting said movable rails to said frame so that said movable rails are movable between a forward and a retracted position and between an upper and a lower position and so that said movable rails extend generally parallel to said stationary rails,
a shaft rotatably mounted to said frame,
means for rotatably driving said shaft,
first means mechanically coupled to said shaft for sequentially moving said movable rails between said upper and lower position, and
second means mechanically coupled to said shaft for sequentially moving said movable rails between said forward and said retracted positions,
said second moving means includes a disk mounted to said shaft so that the axis of the disk is oblique with respect to the axis of said shaft.

2. A conveyor comprising:
a frame having a pair of elongated, spaced apart and parallel stationary rails,
a pair of elongated, spaced apart and parallel movable rails,
means for mounting said movable rails to said frame so that said movable rails are movable between a forward and a retracted position and between an upper and a lower position and so that said movable rails extend generally parallel to said stationary rails,
a shaft rotatably mounted to said frame, means for rotatably driving said shaft,
first means mechanically coupled to said shaft for sequentially moving said movable rails between said upper and lower position, and
second means mechanically coupled to said shaft for sequentially moving said movable rails between said forward and said retracted position,
said second moving means comprising a lever having a midpoint pivotally secured to said frame, means for pivotally securing one end of said lever to said movable rails, a yoke on the other end of said lever, and disk mounted to said shaft so that the axis of the disk is oblique with respect to the axis of said shaft and so that an outer portion of said disk is positioned in said yoke.

3. The invention as defined in claim 2 wherein said first moving means comprises an eccentric cam mounted to said shaft, said cam having a cam surface, a rod vertically slidable mounted to said frame, said rod having one end secured to said movable rails and a cam follower attached to its other end which engages said cam surface.

4. The invention as defined in claim 1 wherein said movable rails comprise at least one straight section and one longitudinally adjacent curved section, means for pivotally securing said straight section to said curved section about a vertical axis.

5. The invention as defined in claim 4 wherein said curved section includes a curved guide plate, said guide plate having the same radius of curvature as said curved section, and means for preventing transverse movement of said guide plate with respect to said frame.

6. The invention as defined in claim 5 wherein said means comprises rollers which engage opposite sides of said curved plate.

7. The invention as defined in claim 3 and comprising a plurality of cams at spaced intervals along said frame.

8. The invention as defined in claim 2 wherein said disk includes two flats at diametrically opposed positions, said flats causing said movable rails to momentarily dwell at said forward and said retracted position.

* * * * *